United States Patent
Park

(10) Patent No.: US 12,217,505 B2
(45) Date of Patent: Feb. 4, 2025

(54) IMAGE-BASED INDOOR POSITIONING SERVICE SYSTEM AND METHOD

(71) Applicant: DABEEO INC., Seoul (KR)

(72) Inventor: Ju Hum Park, Bucheon-si (KR)

(73) Assignee: DABEEO, INC., Seoul (KR)

( * ) Notice: Subject to any disclaimer, the term of this patent is extended or adjusted under 35 U.S.C. 154(b) by 423 days.

(21) Appl. No.: 17/613,567

(22) PCT Filed: Jun. 24, 2019

(86) PCT No.: PCT/KR2019/007581
§ 371 (c)(1),
(2) Date: Nov. 23, 2021

(87) PCT Pub. No.: WO2020/235740
PCT Pub. Date: Nov. 26, 2020

(65) Prior Publication Data
US 2022/0245944 A1  Aug. 4, 2022

(30) Foreign Application Priority Data

May 23, 2019 (KR) .................. 10-2019-0060846

(51) Int. Cl.
*G06V 20/00* (2022.01)
*G06T 7/11* (2017.01)
(Continued)

(52) U.S. Cl.
CPC ............... *G06V 20/36* (2022.01); *G06T 7/11* (2017.01); *G06T 7/136* (2017.01); *G06T 7/75* (2017.01);
(Continued)

(58) Field of Classification Search
CPC .......... G06V 20/36; G06V 20/10; G06T 7/11; G06T 7/136; G06T 7/75;
(Continued)

(56) References Cited

U.S. PATENT DOCUMENTS 11,144,786 B2 * 10/2021 Tomioka ............... G06F 18/214
11,275,947 B2 *  3/2022 Sasao ................... G06F 18/214
(Continued)

FOREIGN PATENT DOCUMENTS

JP   2008310446 A   12/2008
JP   2009074995 A   4/2009
(Continued)

OTHER PUBLICATIONS

International Search Report issued in International Application No. PCT/KR2019/007581 dated Feb. 21, 2020 (2 pages).
(Continued)

*Primary Examiner* — Ping Y Hsieh
*Assistant Examiner* — Vaisali Rao Koppolu
(74) *Attorney, Agent, or Firm* — Osha Bergman Watanabe & Burton LLP

(57) ABSTRACT

Disclosed are an image-based indoor positioning service system and method. A service server includes a communication unit configured to receive a captured image of a node set in an indoor map, and a location estimation model generation unit configured to learn the captured image of the node received through the communication unit, segment the learned captured image to obtain objects, and selectively activate the objects in the learned image to generate a location estimation model.

6 Claims, 9 Drawing Sheets

(51) Int. Cl.
  *G06T 7/136* (2017.01)
  *G06T 7/73* (2017.01)
(52) U.S. Cl.
  CPC ............... *G06T 2207/10004* (2013.01); *G06T 2207/20076* (2013.01); *G06T 2207/20081* (2013.01)
(58) Field of Classification Search
  CPC . G06T 2207/10004; G06T 2207/20076; G06T 2207/20081; G06T 7/73
  See application file for complete search history.

(56) References Cited

U.S. PATENT DOCUMENTS

| 2016/0005229 | A1* | 1/2016 | Lee | G06T 11/60 |
| | | | | 345/419 |
| 2017/0069130 | A1* | 3/2017 | Yoo | G06F 16/29 |
| 2017/0169315 | A1* | 6/2017 | Vaca Castano | G06V 10/25 |
| 2017/0307393 | A1* | 10/2017 | Kobayashi | G01S 5/0264 |
| 2019/0049231 | A1* | 2/2019 | Choi | G01B 7/004 |
| 2019/0130216 | A1* | 5/2019 | Tomioka | G06F 18/214 |
| 2019/0268718 | A1* | 8/2019 | Choi | H04W 4/33 |
| 2020/0285247 | A1* | 9/2020 | Tan | G05D 1/0246 |

FOREIGN PATENT DOCUMENTS

| KR | 20100041926 A | * | 4/2010 | ............ G06Q 50/10 |
| KR | 20110025025 A | | 3/2011 | |
| KR | 20160003553 A | | 1/2016 | |
| KR | 20170030010 A | | 3/2017 | |
| WO | 2017171005 A1 | | 10/2017 | |

OTHER PUBLICATIONS

Written Opinion issued in International Application No. PCT/KR2019/007581 dated Feb. 21, 2020 (5 pages).

* cited by examiner

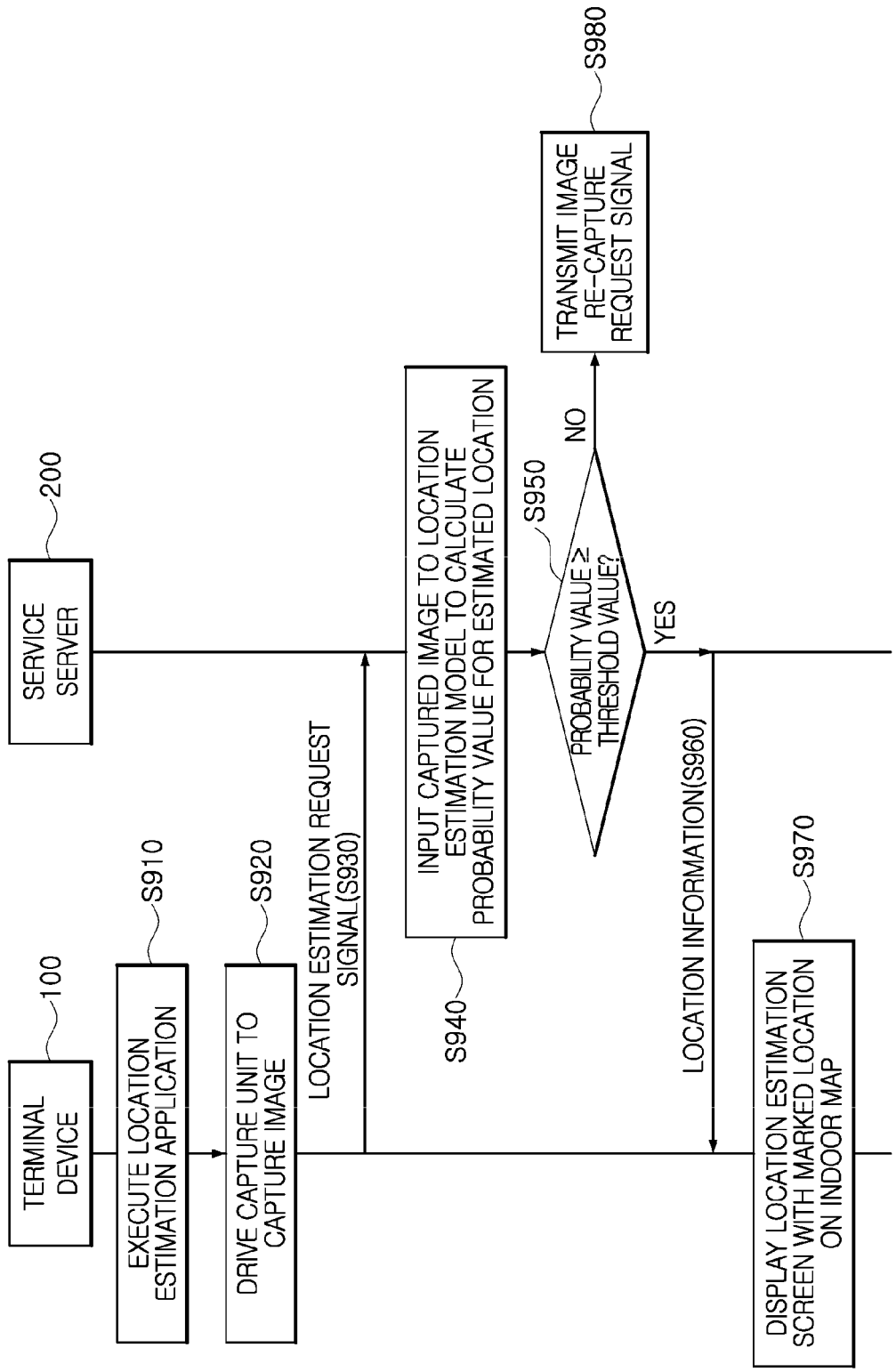

IMAGE-BASED INDOOR POSITIONING SERVICE SYSTEM AND METHOD

TECHNICAL FIELD

The present invention relates to an image-based indoor positioning service system and method and, more particularly, to an image-based indoor positioning service system and method capable of estimating a user's location using an image captured by a photographing unit of a terminal device.

BACKGROUND ART

Various services that provide selective data to multiple users at desired locations, that is, various location-based services (LBS), for example, a real-time data pop-up service, a selective data transmission service according to the user's location, and an indoor navigation service are provided based on a user's current location.

Such a service is based on a technology for measuring a user's location, and a location-based service can provide services such as an indoor map by measuring a user's location using Wi-Fi, a beacon, or the like. In order to properly provide such a location-based service, it is important to accurately identify a user's location. However, when Wi-Fi is used to determine a user's location, an error in the location of the terminal measured inside a building is large, so it is difficult to provide an appropriate location-based service. When beacon transmitters are used, it may be difficult to measure a user's location according to the arrangement intervals of the beacon transmitters. For example, in order to measure a user's location using a beacon, the distance between the beacon and the user must be accurately measured. In practice, an error occurs whenever the distance between the beacon and the user is measured. Particularly, the larger the distance is, the larger the error is. In addition, conventional indoor location estimation techniques have a problem in that expensive equipment or infrastructure must be built.

Accordingly, there is a need to develop a technology capable of estimating an indoor location without establishing expensive equipment or infrastructure.

As the related art of the present invention, there is Korean Patent Publication No. 2011-0025025.

DISCLOSURE

Technical Problem

The present invention has been devised to solve the above problems, and an object of the present invention is to provide an image-based indoor positioning service system and method capable of estimating a user's location using an image captured by a photographing unit of a terminal device.

Objects to be solved by the present invention are not limited to the above-described object, and another object(s) that is not described herein will be clearly understood by those skilled in the art from the following description.

Technical Solution

According to an aspect of the present invention, there is provided a service server including a communication unit configured to receive a captured image of a node set in an indoor map, and a location estimation model generation unit configured to learn the captured image of the node received through the communication unit, segment the learned captured image to obtain objects, and selectively activate the objects in the learned image to generate a location estimation model.

The service server may further include a location estimation unit configured to, when a location estimation request signal including the captured image is received from a terminal device through the communication unit, input the captured image to the location estimation model, estimate a location of the terminal device, and transmit the estimated location to the terminal device.

The location estimation unit may segment the captured image to obtain objects, selectively activate the objects in the image of the location estimation model to calculate a probability value, compare the calculated probability value to a preset threshold value, estimate a corresponding node coordinate as the location of the terminal device when the probability value is greater than or equal to the threshold value, and transmit an image re-capture request signal to the terminal device when the probability value is less than the threshold value.

The location estimation model generation unit may include a collection model configured to collect the captured image of the node set in the indoor map, an image classification module configured to learn the collected captured image of the node, an image segmentation module configured to segment the learned captured image into objects, and a determination module configured to selectively activate the objects in the learned image to generate a location estimation model.

According to another aspect of the present invention, there is provided a terminal device including a communication unit configured to communicate with a service server over a communication network, a storage unit having an indoor map with a preset node; a capture unit, a display unit; and a control unit configured to transmit a location estimation request signal including an image captured through the capture unit to the service server through the communication unit and configured to, when a location corresponding to the image is received from the service server, mark the location on the indoor map and display the indoor map through the display unit in addition to the captured image.

When an image collection application stored in the storage unit is executed, the control unit may display the indoor map and the image captured through the capture unit on the display unit, configure an initial node through the indoor map, store an image captured at a corresponding node according to a node guidance, and transmit the stored captured image of the node to the service server.

According to another aspect of the present invention, there is provided an image-based indoor positioning service method including allowing a service server to collect a captured image of a node set in an indoor map, allowing the service server to learn the collected captured image of the node, allowing the service server to segment the learned captured image into objects; and allowing the service server to selectively activate the objects in the learned captured image to generate a location estimation model.

The image-based indoor positioning service method may further include allowing the service server to, when a location estimation request signal including the captured image is received from a terminal device, input the captured image to the location estimation model, estimate a location of the terminal device, and transmit the estimated location to the terminal device.

Advantageous Effects

The present invention can minimize the influence of movable objects and environments by generating a location estimation model utilizing a selective activation technique and an image segmentation technique for images captured at nodes displayed on an indoor map.

Also, the present invention can accurately estimate an indoor location without establishing expensive equipment or infrastructure by estimating a user's location using an image captured by a camera of a user terminal device in an indoor environment.

Meanwhile, the advantageous effects of the present invention are not limited to the above-mentioned effects, and various effects may be included within the range apparent to those skilled in the art from the above description.

DESCRIPTION OF DRAWINGS

FIG. 9 is a diagram illustrating an image-based indoor positioning method according to an embodiment of the present invention.

MODES OF THE INVENTION

Figure 1:
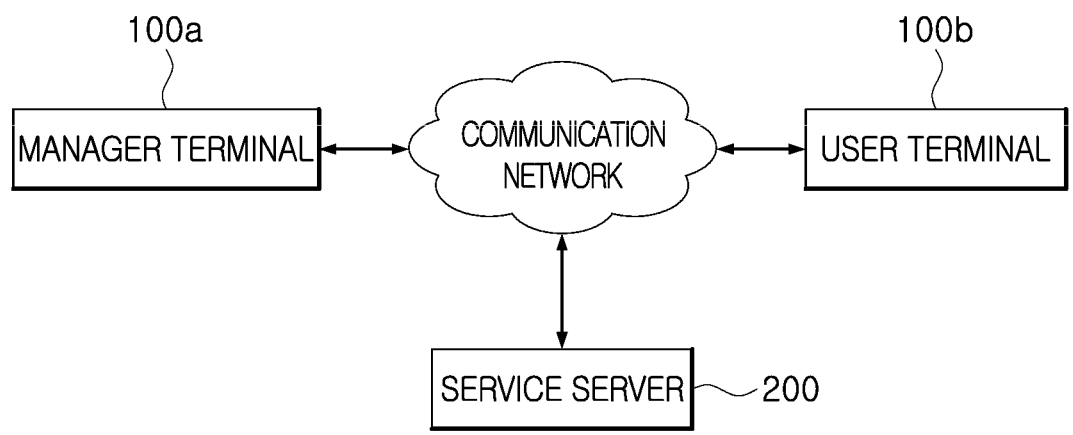
FIG. 1 is a diagram illustrating an image-based indoor positioning system according to an embodiment of the present invention.

Hereinafter, an image-based indoor positioning service system and method according to an embodiment of the present invention will be described with reference to the accompanying drawings. In the drawings, thicknesses of lines or sizes of elements may be exaggerated for clarity and convenience.

Also, the following terms are defined considering functions of the present invention and may be defined differently depending on a user, the intent of an operator, or a custom. Therefore, the terms should be defined based on the entire contents of the specification.

Also, the implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example. an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, mobile phones, portable/personal digital assistants (PDAs), and other devices that facilitate communication of information between end-users.

Figure 2:
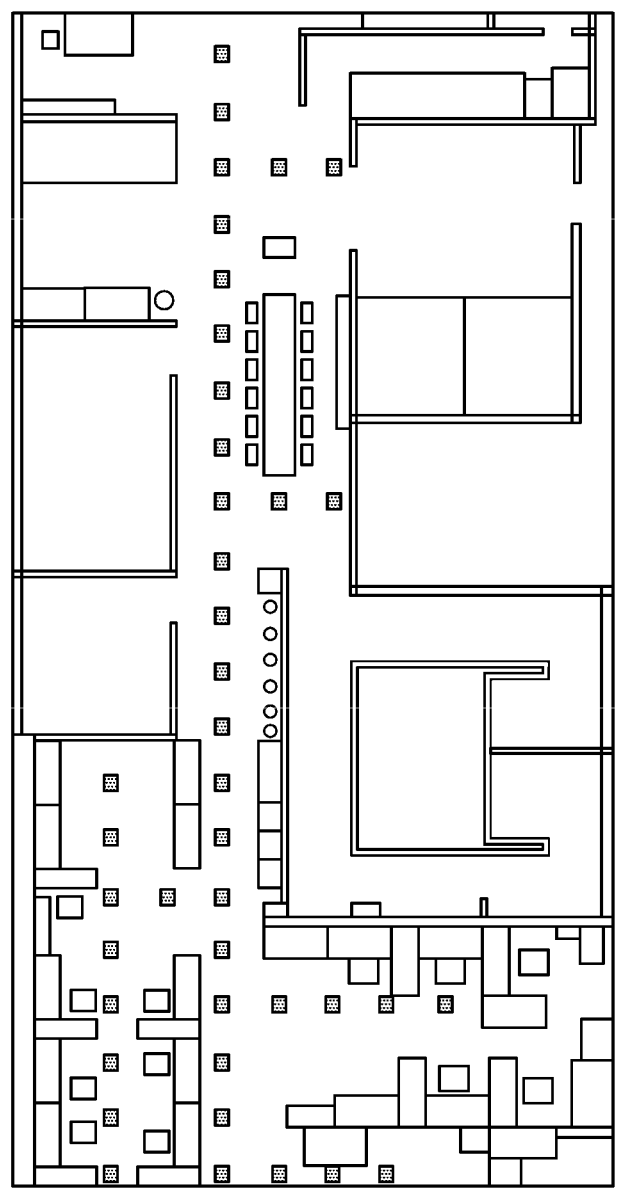
FIG. 2 is an exemplary diagram illustrating an indoor map according to an embodiment of the present invention.

FIG. 1 is a diagram illustrating an image-based indoor positioning system according to an embodiment of the present invention, and FIG. 2 is an exemplary diagram illustrating an indoor map according to an embodiment of the present invention.

Referring to FIG. 1, an image-based indoor positioning system according to an embodiment of the present invention includes a manager terminal 100a, a service server 200, and a user terminal 100b. In this case, the manager terminal 100a, the service server 200, and the user terminal 100b may be connected over various types of wireless communication networks such as Wi-Fi, 3G, and LTE.

The manager terminal 100a stores an image collection application, stores images captured at nodes displayed on an indoor map through the image collection application, and transmits the stored node-specific image to a service server. Here, the indoor map may be a digitized (vectorized) map produced using computer-aided design (CAD) drawings, Point Cloud Map, Lidar Map, and image map, and the like, and the digitized map may be a map usable in the manager terminal 100a and the user terminal 100b. For example, the indoor map may be a map digitized using a planar image or an architectural drawing. The planar image includes boundary lines that partition spaces in buildings such as shopping malls, department stores, public facilities, and industrial facilities. The boundary lines are components for partitioning the corresponding spaces in the planar image. In at least one of the spaces partitioned by the boundary lines in the planar image, a route through which a user may walk may be set, and a node may be displayed on the path. Architectural drawings are drawings used for the construction of buildings such as shopping malls, department stores, public facilities, and industrial facilities and may be produced in a CAD file or image file format.

The nodes displayed on the indoor map may refer to a set of points where pedestrians are likely to be located in the indoor environment. For example, the indoor map may be as shown in FIG. 2, and a black rectangle on the indoor map may be a node. In the indoor map, the coordinates of the upper left corner may be set to [0,0], and the coordinates of each node may be set based on the upper left corner. In this case, the scale ratio of the indoor map may be preset by the manager.

As described above, the manager terminal 100a captures an image at each node displayed on the indoor map and provides the node-specific captured image to the service server 200 so that the image can be used as training data to generate a location estimation model.

The service server 200 collects an image captured at each node set on the indoor map from the manager terminal 100a and learns the collected node-specific images to generate a location estimation model. In this case, the service server 200 may generate the location estimation model using deep learning. In detail, the service server 200 may generate the location estimation model using selective activation and image segmentation. Here, the selective activation may refer to preferentially learning a part to be learned in an image, and the image segmentation may refer to dividing an image into several sets of objects in order to interpret the image more meaningfully.

Also, when a location estimation request signal including a captured image is received from the user terminal 100b, the service server 200 estimates the location of the user terminal 100b by inputting the captured image to the location estimate model.

The service server 200 will be described in detail with reference to FIG. 6.

The user terminal 100b has a location estimation application stored therein, captures a surrounding environment through the location estimation application, transmits a location estimation request signal including the captured image to the service server 200, and receives a location corresponding to the captured image from the service server 200. Here, the location corresponding to the captured image may be the location of the user terminal 100b.

Meanwhile, in this embodiment, the manager terminal 100a and the user terminal 100b have been described separately, but the manager terminal 100a and the user terminal 100b may be the same terminal. Accordingly, for convenience of following description, the manager terminal 100a and the user terminal 100b will be referred to as a terminal device 100.

Figure 3:
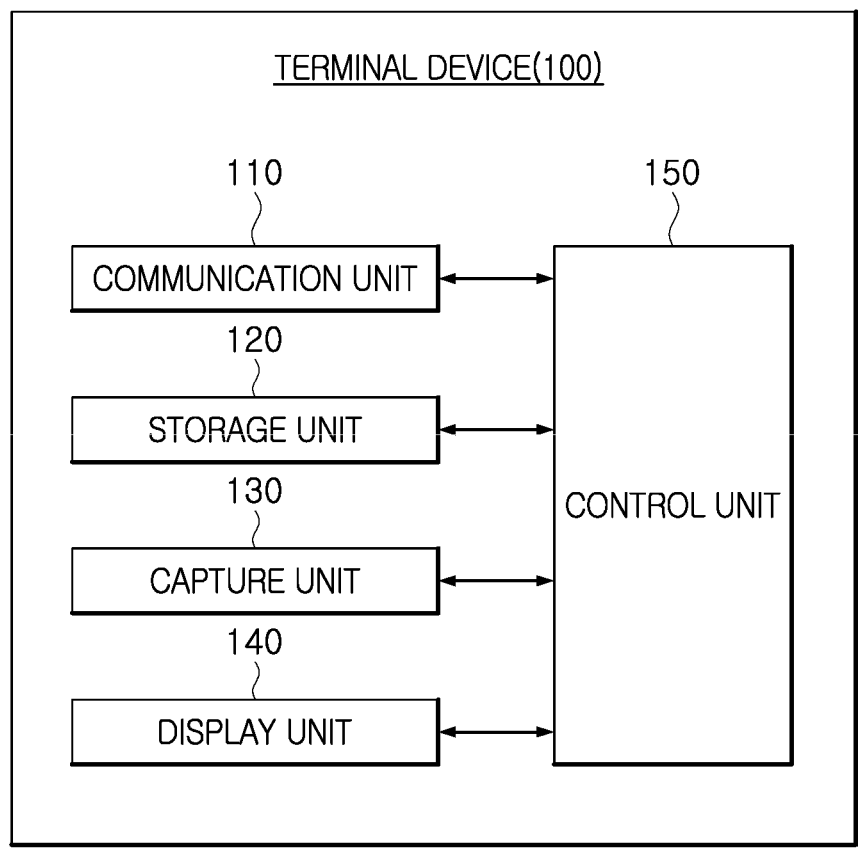
FIG. 3 is a block diagram showing the configuration of a terminal device according to an embodiment of the present invention.
Figure 4:
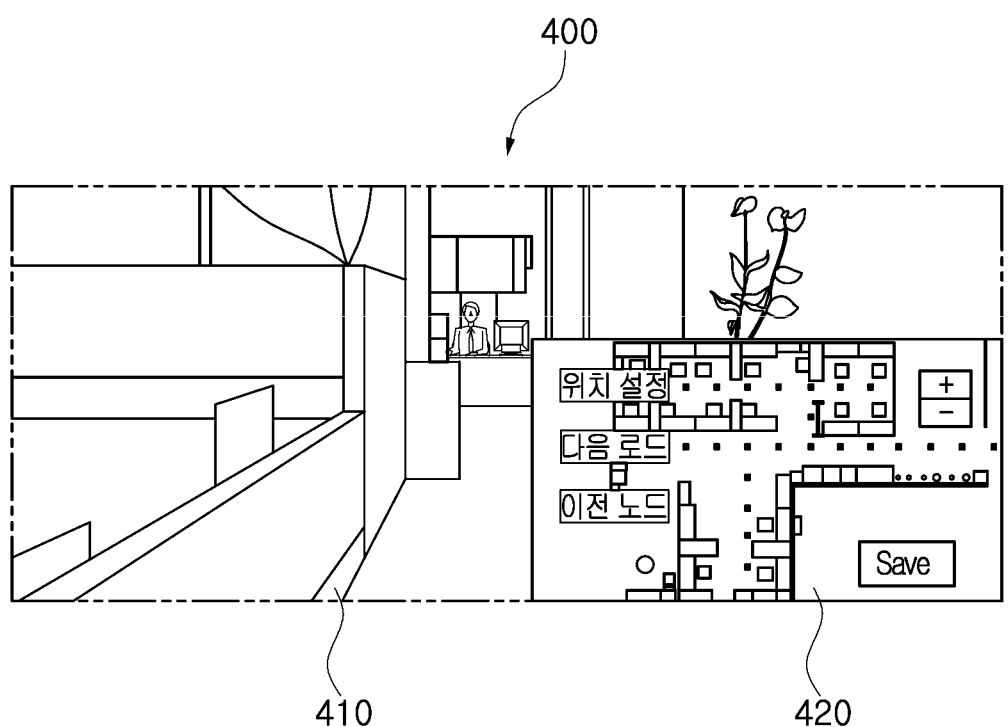
FIG. 4 is an exemplary diagram illustrating an image collection screen according to an embodiment of the present invention.
Figure 5:
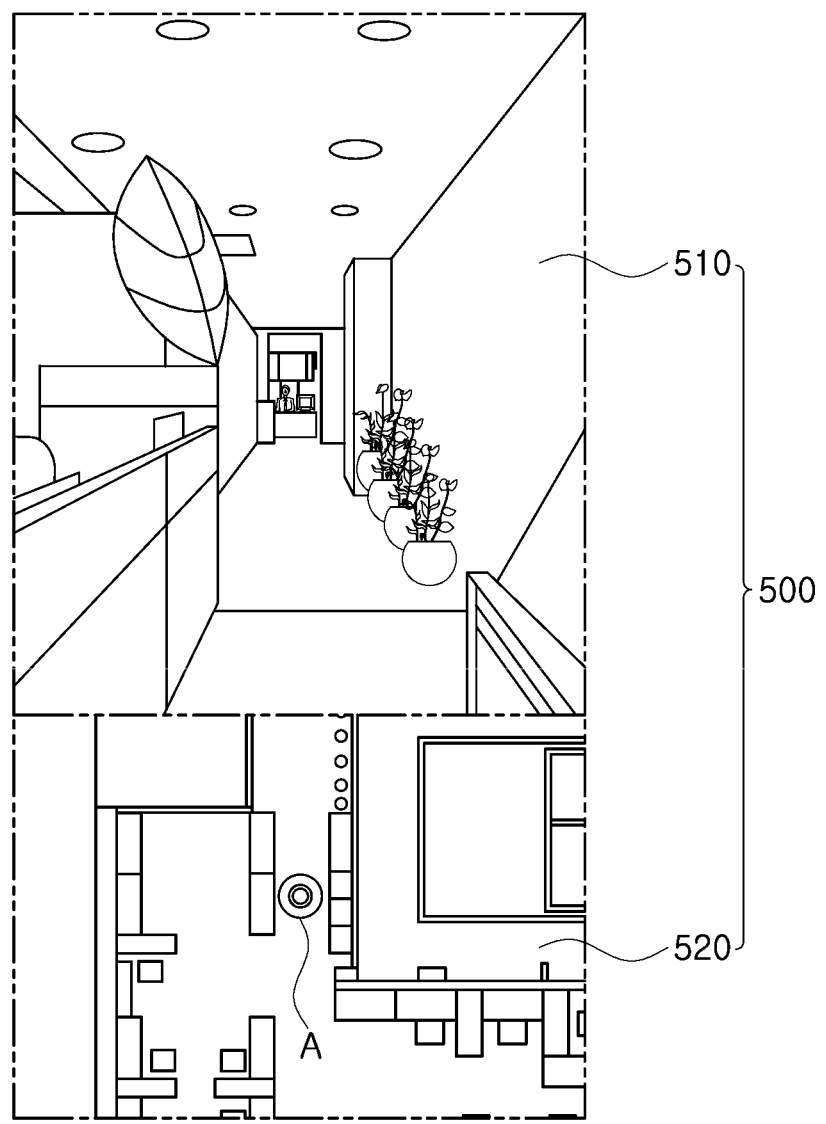
FIG. 5 is an exemplary diagram illustrating a location estimation screen according to an embodiment of the present invention.

FIG. 3 is a block diagram showing the configuration of a terminal device according to an embodiment of the present invention, FIG. 4 is an exemplary diagram illustrating an image collection screen according to an embodiment of the present invention, and FIG. 5 is an exemplary diagram illustrating a location estimation screen according to an embodiment of the present invention.

Referring to FIG. 3, the terminal device 100 according to an embodiment of the present invention includes a communication unit 110, a storage unit 120, a capture unit 130, a display unit 140, and a control unit 150.

The communication unit 110, which is an element for communication with the service server 200 over a communication network, may transmit or receive a variety of information such as an image acquired through the capture unit 130. In this case, the communication unit 110 may be implemented in various forms, such as a short-range communication module, a wireless communication module, a mobile communication module, and a wired communication module.

The storage unit 120 is an element for storing data related to the operation of the terminal device 100. Here, the storage unit 120 may use known storage media and may use one or more of the known storage media, such as read-only memory (ROM), programmable ROM (PROM), erasable programmable ROM (EPROM), electrically erasable ROM (EEPROM), and random access memory (RAM). In particular, an indoor map including a preset node may be stored in the storage unit 120. Also, in order to collect learning data for generating a location estimation model, an image collection application capable of acquiring a node-specific captured image by driving the capture unit 130 may be stored in the storage unit 120. Also, a location estimation application for estimating the current location using an image may be stored in the storage unit 120.

The capture unit 130 acquires an image when the image collection application or the image estimation application is executed and transmits the acquired image to the control unit 150. The capture unit 130 may be, for example, a camera.

The display unit 140 is an element for displaying a variety of information related to the operation of the terminal device 100. In particular, the display unit 140 may display an image collection screen when the image collection application is executed and may display an image estimation screen when the location estimation application is executed. The display unit 140 may function as an input unit for receiving information from a user.

When the image collection application stored in the storage unit 120 is executed, the control unit 150 drives the capture unit 130 and displays an image captured through the capture unit 130 and the indoor map on a display unit. That is, when the image collection application is executed, the control unit 150 displays an image collection screen 400 including a captured image 410 and an indoor map 420, as shown in FIG. 4. A user sets an initial node for designating an image collection start location through the indoor map 420 of the image collection screen 400. Then, the control unit 150 provides node guidance such as next-node guidance and previous-node guidance, and the user captures an image at the corresponding node according to the node guidance. In this case, the node guidance may be output by voice or displayed as a symbol on the indoor map, and the user may capture one or more images at each node. Then, the control unit 150 stores the images acquired at each node according to the node guidance and transmits the stored and captured images of each node to the service server 200. That is, when the image collection for all nodes is completed, the control unit 150 transmits the collected image and node coordinates to the service server 200. In this case, the number of nodes on the indoor map and the direction of capture may be preset depending on the manager.

Also, when the location estimation application stored in the storage unit 120 is executed, the control unit 150 drives the capture unit 130 and transmits a location estimation request signal including an image captured through the capture unit 130 to the service server 200 through the communication unit 110. Then, when a location corresponding to the image is received from the service server 200, the control unit 150 displays the location on the indoor map and displays the location through the display unit 140 in addition to the captured image. That is, when the user's location is estimated through the location estimation application, the control unit 150 may display a location estimation screen 500 including a captured image 510 and an indoor map 520 with its own location A, as shown in FIG. 5.

The control unit 150 may include at least one computing device. Here, the computing device may be a general-purpose central processing unit (CPU), a programmable device element implemented appropriately for a specific purpose (a complex programmable logic device (CPLD) and a field-programmable gate array (FPGA)), an application-specific integrated circuit (ASIC), or a microcontroller chip.

Meanwhile, the terminal device 100 configured as described above may be an electronic device capable of capturing a surrounding environment through the capture unit 130 and applicable to various wired and wireless environments. For example, the terminal device 100 is a personal digital assistant (PDA), a smart phone, a cellular phone, a personal communication service (PCS) phone, a Global System for Mobile (GSM) phone, a Wideband CDMA (W-CDMA) phone, a CDMA-2000 phone, a Mobile Broadband System (MBS) phone, etc. Here, the terminal device 100 may represent a small portable device but may be referred to as a mobile communication terminal if the terminal device 100 includes a camcorder or a laptop computer. Accordingly, this embodiment of the present invention will not be particularly limited thereto.

Figure 6:
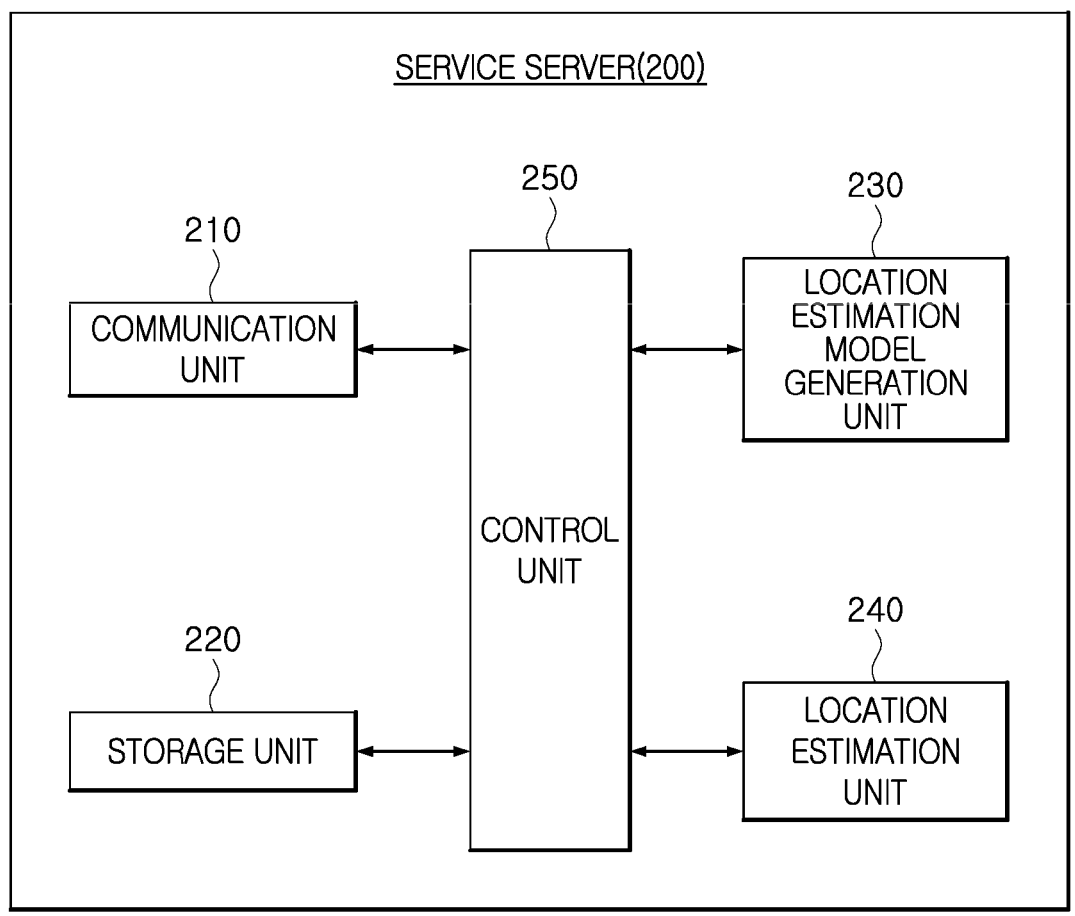
FIG. 6 is a block diagram showing the configuration of a service server according to an embodiment of the present invention.
Figure 7:
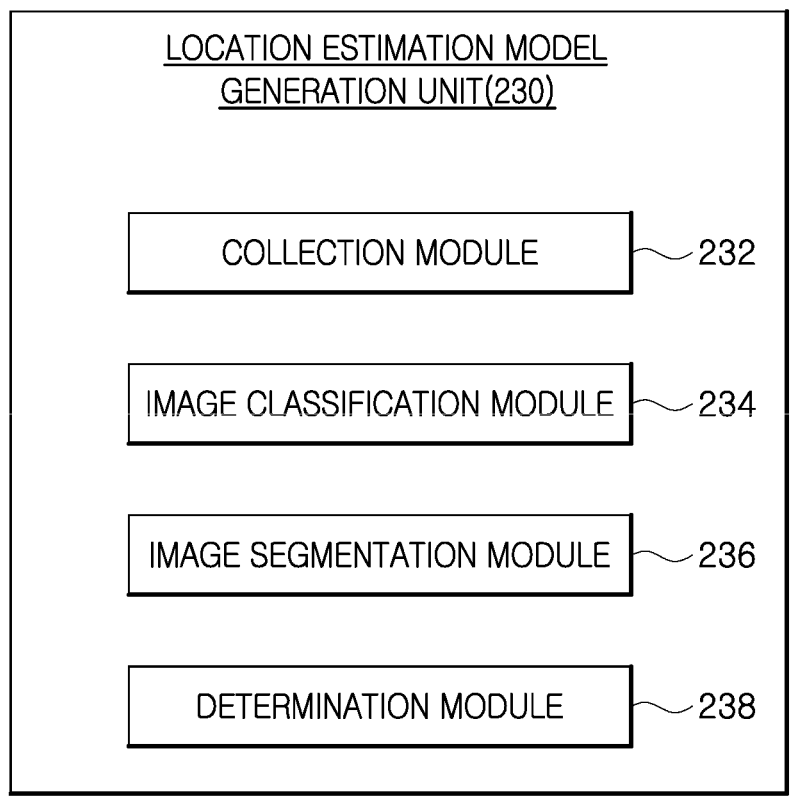
FIG. 7 is a detailed block diagram showing the configuration of a location estimation model generation unit shown in FIG. 6.

FIG. 6 is a block diagram showing the configuration of a service server according to an embodiment of the present invention, and FIG. 7 is a detailed block diagram showing the configuration of a location estimation model generation unit shown in FIG. 6.

Referring to FIG. 6, the service server 200 according to an embodiment of the present invention includes a communication unit 210, a storage unit 220, a location estimation model generation unit 230, a location estimation unit 240, and a control unit 250.

The communication unit 210 receives a node-specific captured image or a location estimation request signal including the captured image.

The storage unit 220 is an element for storing data related to the operation of the service server 200. In particular, the storage unit 220 may store an indoor map with a preset node.

The location estimation model generation unit 230 receives a node-coordinate-specific captured image from the terminal device 100 through the communication unit 210, learns the received node-coordinate-specific captured image, segments the learned captured image into objects, and selectively activates the objects in the learned image to generate a location estimation model. In this case, the location estimation model generation unit 230 may generate the location estimation model using deep learning. The location estimation model may be in a form in which a node-coordinate-specific optimal image is mapped. Therefore, when an image of which the location is unknown is input, the location estimation model may calculate node coordinates corresponding to the image as an output value.

The location estimation model generation unit 230 includes a collection module 232, an image classification module 234, an image segmentation module 236, and a determination module 238.

The collection module 232 collects a captured image at each node coordinate set in the indoor map.

The image classification module 234 learns captured images of each node coordinate collected by the collection module 232. In this case, the image classification module 234 may learn the captured images of each node using resnet.

The image segmentation module 236 segments the captured image learned by the image classification module 234 into objects. In this case, the image segmentation module 236 may segment the learned image according to objects such as a person, a desk, a wall, and a chair using, for example, Fusion net.

The determination module 238 generates a location estimation model by selectively activating the objects obtained through the segmentation by the image segmentation module 236. In this case, the determination module 238 may generate a location estimation model by selectively activating the objects using, for example, the softmax function. That is, the determination module 238 increases the weight of a portion where an object to be activated is located in the image learned by the image classification module 234, and in the opposite case, the determination module 238 decreases the weight. In other words, finally, the determination module 238 may selectively activate only a portion that is to be learned. For example, the weight of a portion where a person, which is a dynamic object, is present may be set to "0."

As described above, the location estimation model generation unit 230 can minimize the influence of movable objects and environments by generating a location estimation model utilizing a selective activation technique and an image segmentation technique.

When a location estimation request signal including the captured image is received from the terminal device 100, the location estimation unit 240 inputs the captured image to the location estimation model generated by the location estimation model generation unit 230 to estimate the location of the terminal device 100 and transmits the estimated location to the terminal device 100. When an image of which the location is unknown is input, the location estimation model may output a node coordinate corresponding to the image.

Specifically, when the position estimation request signal including the image is received, the location estimation unit 240 may segment the image according to objects and selectively activate the objects in the image of the location estimation model to calculate a normalized probability value. In this case, the location estimation unit 240 may calculate the normalized probability value through the Softmax function. Then, the location estimation unit 240 may compare the calculated probability value to a preset threshold value and may estimate a corresponding node coordinate as the user's location and transmit the user's location to the terminal device 100 when the comparison result is that the calculated probability value is greater than or equal to the threshold value. When the probability value is not greater than or equal to the threshold value, the location estimation unit 240 transmits an image re-capture request signal to the terminal device 100. Then, the terminal device 100 may re-capture an image and request location estimation.

Meanwhile, the location estimation model generation unit 230 and the location estimation unit 240 may be implemented by a processor required to execute a program on a computing device. Similarly, the location estimation model generation unit 230 and the location estimation unit 240 may be implemented by physically independent components and may be implemented as distinct functions in one processor.

The control unit 250, which is an element for controlling the operation of various elements of the service server 200 including the communication unit 210, the storage unit 220, the location estimation model generation unit 230, and the location estimation unit 240, includes at least one computing device. Here, the computing device may be a general-purpose central processing unit (CPU), a programmable device element implemented appropriately for a specific purpose (a complex programmable logic device (CPLD) and a field-programmable gate array (FPGA)), an application-specific integrated circuit (ASIC), or a microcontroller chip.

Figure 8:
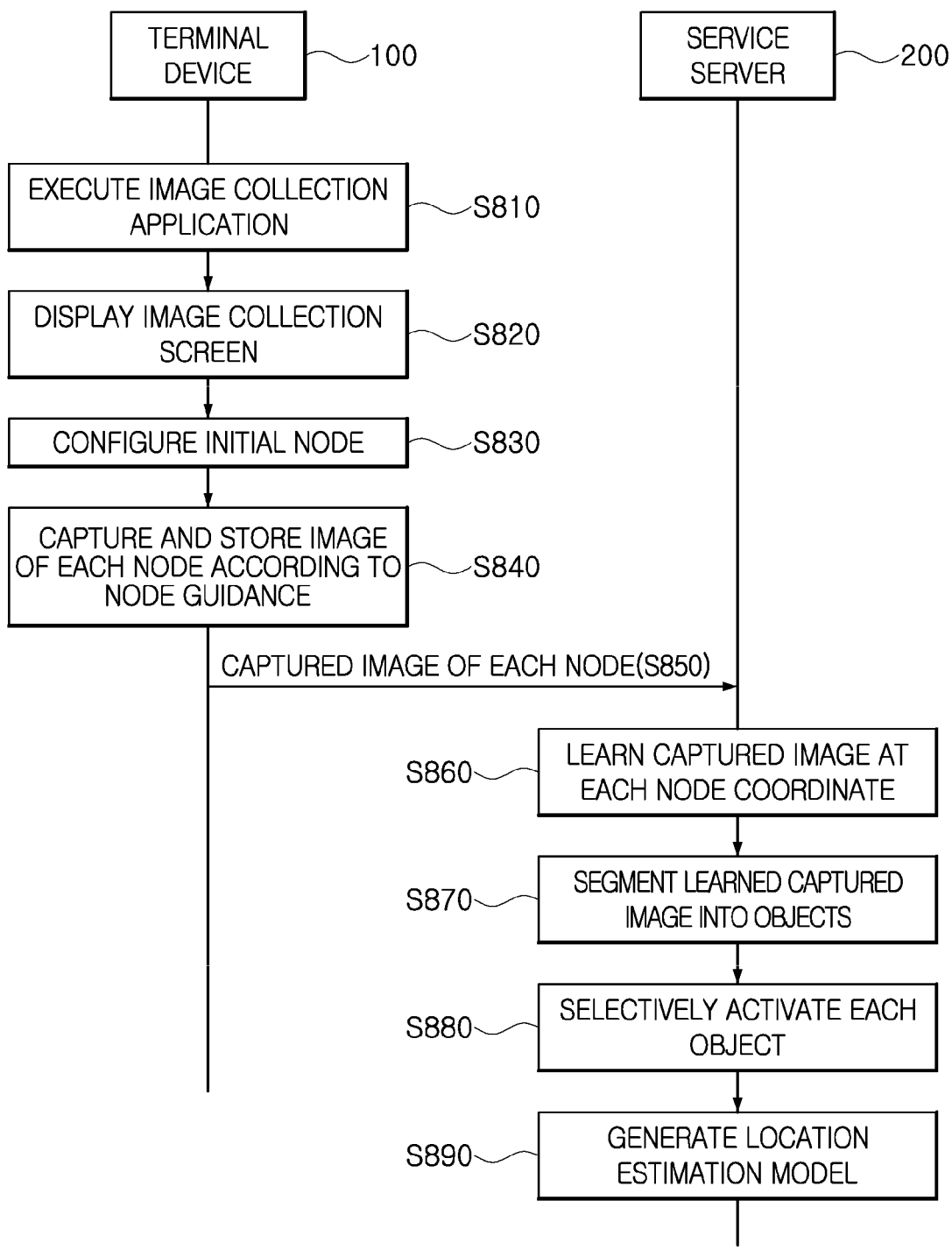
FIG. 8 is a diagram illustrating a location estimation model generation method according to an embodiment of the present invention.

FIG. 8 is a diagram illustrating a location estimation model generation method according to an embodiment of the present invention.

Referring to FIG. 8, when an image collection application is executed (S810), a terminal device 100 drives a capture unit 130 and displays an image collection screen including an indoor map and an image captured through the capture unit 130 (S820).

When operation S820 is performed, the terminal device 100 configures a designated initial node through the indoor map of the image collection screen (S830) and captures and stores an image at each node according to a node guidance (S840).

When the image capturing is completed at all nodes on the indoor map by performing operation S840, the terminal device 100 transmits the captured images of the nodes to a service server 200 (S850).

When operation S850 is performed, the service server 200 learns the captured images of the node coordinates transmitted from the terminal device 100 (S860), segments the learned captured images into objects (S870), and selectively activates the objects in the learned images (S880) to generate a location estimation model (S890). In this case, the service server 200 may generate the location estimation model using deep learning.

FIG. 9 is a diagram illustrating an image-based indoor positioning method according to an embodiment of the present invention.

Referring to FIG. 9, when an image collection application is executed (S910), a terminal device 100 drives a capture unit 130 to capture an image (S920) and transmits a location estimation request signal including the captured image to a service server 200 (S930).

When operation S930 is performed, the service server 200 inputs the captured image to the location estimation model to calculate a probability value for the location (S940). In this case, the service server 200 may segment the image according to objects and selectively activate the objects in the image of the location estimation model to calculate a normalized probability value.

When operation S940 is performed, the service server 200 determines whether the calculated probability value is greater than or equal to a preset threshold value (S950).

When the determination result of operation S950 is that the probability value is greater than or equal to the threshold value, the service server 200 estimates a corresponding node coordinate as a user's location and transmits the location to the terminal device 100 (S960).

Then, the terminal device 100 may display a location estimation screen having the location on an indoor map (S970).

When the determination result of operation S950 is that the probability value is not greater than or equal to the threshold value, the service server 200 transmits an image re-capture request signal to the terminal device 100 (S980). Then, the terminal device 100 may re-capture an image and request location estimation.

As described above, the image-based indoor positioning service system and method according to an embodiment of the present invention can minimize the influence of moving objects and environments by generating a location estimation model using a selective activation technique and an image segmentation technique for images captured at nodes marked on an indoor map and also can accurately estimate an indoor location without constructing expensive equipment or infrastructure by estimating a user's location using an image captured by a camera of a user terminal device in an indoor environment.

While the present invention has been described with reference to an embodiment shown in the accompanying drawings, it should be understood by those skilled in the art that this embodiment is merely illustrative of the invention and that various modifications and equivalents may be made without departing from the spirit and scope of the invention. Therefore, the technical scope of the present invention should be defined by the following claims.

The invention claimed is:

1. A service server comprising:
   a storage that stores an indoor map where node coordinates are preset along a route through which a user walks;
   a communication module that receives, from a terminal device, a location estimation request signal including a captured image of a node at one of the node coordinates;
   a location estimation model generation unit that:
   learns the captured image, segments the captured image learned by the location estimation model generation unit into objects, and
   selectively activates the objects in the captured image learned by the location estimation model generation unit to generate a location estimation model in which a node-coordinate-specific image is mapped to each of the node coordinates, wherein the location estimation model outputs a node coordinate corresponding to an image of which a location is unknown in response to input of the image; and
   a location estimation unit that, in response to the communication module receiving the location estimation request signal,
   estimates a location of the terminal device by inputting the captured image to the location estimation model and obtaining a node coordinate corresponding to the captured image, and
   transmits the estimated location, to the terminal device, to cause the terminal device to display a location estimation screen that shows the captured image and the indoor map including a mark indicating the location of the terminal device identified by the node coordinate.

2. The service server of claim 1, wherein the location estimation unit segments the captured image into objects, selectively activates the objects in the captured image of the location estimation model to calculate a probability value, compares the probability value to a preset threshold value, estimates a corresponding node coordinate as the location of the terminal device when the probability value is greater than or equal to the threshold value, and transmits an image re-capture request signal to the terminal device when the probability value is less than the threshold value.

3. The service server of claim 1, wherein the location estimation model generation unit comprises:
   a collection model that collects the captured image;
   an image classification module that learns the captured image;
   an image segmentation module that segments the captured image learned by the image classification module into objects; and
   a determination module that selectively activates the objects in the captured image learned by the image classification module to generate the location estimation model.

4. A terminal device comprising:
   a communication module that communicates with a service server over a communication network, the service server storing an indoor map where node coordinates are preset along a route through which a user walks;
   a storage unit that stores the indoor map;
   a capture unit that obtains a captured image of a node at one of the node coordinates;
   a display unit; and
   a computing device that:
   transmits a location estimation request signal including the captured image to the service server by the communication module,
   upon receiving from the service server a location of the terminal device estimated by inputting the captured image to a location estimation model and obtaining a node coordinate corresponding to the captured image, marks the location of the terminal device on the indoor map, wherein
   a node-coordinate-specific image is mapped to each of the node coordinates in the location estimation model, and the location estimation model outputs a node coordinate corresponding to an image of which a location is unknown in response to input of the image, and displays by the display unit a location estimation screen that shows the captured image and the indoor map including a mark indicating the location of the terminal device identified by the node coordinate.

5. The terminal device of claim 4, wherein with an image collection application stored in the storage unit, the computing device configures initial nodes through the indoor map, stores the captured image at a corresponding node among the nodes according to a node guidance, and transmits the captured image stored at the corresponding node to the service server.

6. An image-based indoor positioning service method comprising:
   storing, in a storage, an indoor map where node coordinates are preset along a route through which a user walks;
   receiving, from a terminal device, a location estimation request signal including a captured image of a node at one of the node coordinates;
   learning the captured image;
   segmenting the captured image learned by the learning into objects;
   selectively activating the objects in the captured image learned by the learning to generate a location estimation model in which a node-coordinate-specific image is mapped to each of the node coordinates, wherein the location estimation model outputs a node coordinate corresponding to an image of which a location is unknown in response to input of the image; and
   upon receiving the location estimation request signal,
      estimating a location of the terminal device by inputting the captured image to the location estimation model and obtaining a node coordinate corresponding to the captured image, and
      transmit the estimated location, to the terminal device, to cause the terminal device to display a location estimation screen that shows the captured image and the indoor map including a mark indicating the location of the terminal device identified by the node coordinate.

* * * * *